United States Patent
Call et al.

(10) Patent No.: US 9,520,046 B2
(45) Date of Patent: Dec. 13, 2016

(54) REFUSE REMOVAL REMINDERS

(71) Applicant: Vivint, Inc., Provo, UT (US)

(72) Inventors: Brian Call, Draper, UT (US); Nicholas Brown, Draper, UT (US); Jason Carter, Lehi, UT (US); Darren Noble, Pleasant Grove, UT (US)

(73) Assignee: Vivint, Inc., Provo, UT (US)

( * ) Notice: Subject to any disclaimer, the term of this patent is extended or adjusted under 35 U.S.C. 154(b) by 60 days.

(21) Appl. No.: 14/481,709

(22) Filed: Sep. 9, 2014

(65) Prior Publication Data

US 2016/0071396 A1    Mar. 10, 2016

(51) Int. Cl.
| | |
|---|---|
| *G08B 21/00* | (2006.01) |
| *G08B 21/24* | (2006.01) |
| *B30B 9/30* | (2006.01) |
| *G06Q 10/06* | (2012.01) |
| *G06Q 50/00* | (2012.01) |

(52) U.S. Cl.
CPC ............. *G08B 21/24* (2013.01); *B30B 9/3007* (2013.01); *G06Q 10/06* (2013.01); *G06Q 50/00* (2013.01)

(58) Field of Classification Search
CPC ...... G06Q 10/047; G06Q 10/06; G06Q 10/08; G06Q 99/00; B65F 1/004; B65F 1/1484; B65F 1/14; B65F 1/1426
USPC ............ 340/870.16, 506, 568.1, 686.1, 572.1,340/686.6; 705/308, 7.13, 500; 702/188; 100/50, 35, 99, 45
See application file for complete search history.

(56) References Cited

U.S. PATENT DOCUMENTS

| | | | | |
|---|---|---|---|---|
| 4,860,267 A | * | 8/1989 | Herrington | B65F 1/14 220/908 |
| 4,912,687 A | * | 3/1990 | Treeby | G04C 3/002 220/908 |
| 5,163,805 A | * | 11/1992 | Mezey | B65F 1/004 414/810 |
| 5,205,698 A | * | 4/1993 | Mezey | B65F 1/004 414/406 |
| 5,230,393 A | * | 7/1993 | Mezey | B65F 3/08 177/139 |
| 5,610,516 A | * | 3/1997 | Maier | B65F 1/14 324/226 |
| 5,967,028 A | * | 10/1999 | Schomisch | B30B 9/3007 100/229 A |
| 6,150,939 A | * | 11/2000 | Lin | B65F 1/1426 248/147 |

(Continued)

FOREIGN PATENT DOCUMENTS

| | | |
|---|---|---|
| WO | 2009114582 | 9/2009 |
| WO | 2012164098 | 12/2012 |

(Continued)

*Primary Examiner* — Hoi Lau
(74) *Attorney, Agent, or Firm* — Holland & Hart LLP

(57) ABSTRACT

According to at least one embodiment, a computer-implemented method to communicate refuse reminders to a user of an automation system is disclosed. A proximity of at least one refuse bin to a base station may be detected at a predetermined time period prior to the refuse removal day using one or more sensors. The user may be alerted to move the at least one refuse bin to a removal location based at least in part on the detecting. In some embodiments, the refuse removal scheduled may be linked with the automation system, wherein the refuse removal schedule may comprise a schedule of refuse pick-up days for a first category of refuse.

18 Claims, 6 Drawing Sheets

(56) References Cited

U.S. PATENT DOCUMENTS

| | | | | |
|---|---|---|---|---|
| 6,360,186 B1* | 3/2002 | Durbin | ................ | B30B 9/3007 100/99 |
| 6,367,377 B1* | 4/2002 | Gawley | ................ | B30B 1/006 100/229 A |
| 6,408,261 B1* | 6/2002 | Durbin | ................ | B30B 9/3007 100/99 |
| 6,453,270 B1* | 9/2002 | Durbin | ................ | B30B 9/3007 340/449 |
| 6,526,421 B1* | 2/2003 | Houldsworth | ......... | G06F 8/445 |
| 6,561,085 B1* | 5/2003 | Durbin | ................ | B30B 9/3007 100/229 A |
| 6,687,656 B2* | 2/2004 | Durbin | ................ | B30B 9/3007 340/449 |
| 7,406,402 B1* | 7/2008 | Waitkus, Jr. | .......... | G06Q 10/08 702/188 |
| 7,957,937 B2* | 6/2011 | Waitkus, Jr. | .......... | G06Q 10/08 702/188 |
| 8,720,686 B1* | 5/2014 | Shuman | ................ | B65F 1/14 206/459.1 |
| 2002/0030595 A1* | 3/2002 | Kasik | ................ | B65F 1/14 340/568.1 |
| 2002/0108507 A1* | 8/2002 | May | ................ | B30B 9/3007 100/45 |
| 2005/0281653 A1 | 12/2005 | Channel | | |
| 2007/0262878 A1* | 11/2007 | Maruca | ................ | G06Q 10/06 340/686.1 |
| 2007/0268759 A1* | 11/2007 | Sabino | ................ | B65F 1/1484 365/192 |
| 2008/0061977 A1* | 3/2008 | Maruca | ................ | B65F 1/1484 340/572.1 |
| 2009/0119962 A1* | 5/2009 | De La Cruz | ............ | B65F 1/14 40/616 |
| 2010/0071572 A1* | 3/2010 | Carroll | ................ | B30B 9/3042 100/229 A |
| 2010/0119341 A1* | 5/2010 | Flood | ................ | B65F 1/1484 414/406 |
| 2011/0238598 A1* | 9/2011 | Borowski | ............ | G06Q 99/00 705/500 |
| 2011/0259467 A1* | 10/2011 | Maness | ............. | A61B 19/0287 141/1 |
| 2013/0062444 A1* | 3/2013 | Jensen | ................ | B02C 25/00 241/30 |
| 2014/0172174 A1* | 6/2014 | Poss | ................ | G05B 15/02 700/275 |
| 2014/0214697 A1* | 7/2014 | McSweeney | ......... | B65F 1/004 705/308 |
| 2014/0278630 A1* | 9/2014 | Gates | ................ | G06Q 10/047 705/7.13 |
| 2015/0298903 A1* | 10/2015 | Luxford | ................ | G06Q 10/06 340/870.16 |
| 2015/0307273 A1* | 10/2015 | Lyman | ................ | B65F 1/16 705/7.13 |
| 2015/0323366 A1* | 11/2015 | Kekalainen | ............ | G01D 11/30 702/188 |
| 2015/0324760 A1* | 11/2015 | Borowski | ............ | B65F 1/0006 705/308 |
| 2015/0339914 A1* | 11/2015 | Kekalainen | ............ | G01D 4/002 340/506 |
| 2015/0348252 A1* | 12/2015 | Mask | ................ | G06T 7/003 382/103 |

FOREIGN PATENT DOCUMENTS

| | | |
|---|---|---|
| WO | 2014063184 | 5/2014 |
| WO | 2014066429 | 5/2014 |

* cited by examiner

REFUSE REMOVAL REMINDERS

BACKGROUND

Advancements in media delivery systems and media-related technologies continue to increase at a rapid pace. Increasing demand for media has influenced the advances made to media-related technologies. Computer systems have increasingly become an integral part of the media-related technologies. Computer systems may be used to carry out several media-related functions. The wide-spread access to media has been accelerated by the increased use of computer networks, including the Internet and cloud networking.

Many homes and businesses use one or more computer networks to generate, deliver, and receive data and information between the various computers connected to computer networks. Users of computer technologies continue to demand increased access to information and an increase in the efficiency of these technologies. Improving the efficiency of computer technologies is desirable to those who use and rely on computers.

With the wide-spread use of computers and mobile devices has come an increased presence of home automation and security products. Home automation and security products can help manage busy lives by reminding users to perform household chores and other duties.

SUMMARY

According to at least one embodiment, a computer-implemented method to communicate refuse reminders to a user of an automation system is disclosed. A proximity of at least one refuse bin to a base station may be detected at a predetermined time period prior to the refuse removal day using one or more sensors. The user may be alerted to move the at least one refuse bin to a removal location based at least in part on the detecting. In some embodiments, the refuse removal scheduled may be linked with the automation system, wherein the refuse removal schedule may comprise a schedule of refuse pick-up days for a first category of refuse.

In some embodiments, the proximity of the at least one refuse bin to the base station is detected at a predetermined time period after a scheduled refuse removal. The user may be alerted to return the at least one refuse bin to the base station based at least in part on the detecting. In some embodiments, an administrator of the automation system may be alerted when the at least one refuse bin is within a predetermined proximity of the base station at a predetermined time period before the scheduled refuse removal.

In some embodiments, a proximity of a first refuse bin to a first base station is detected on a first schedule and a proximity of a second refuse bin to a second base station is detected on a second schedule. A location of the refuse removal vehicle may be detected. The location of the refuse removal vehicle may be compared to a refuse removal route. It may be determined if the refuse removal vehicle passed the location of the automation system on the refuse removal route. The user may be alerted of the missed opportunity to have refuse removed if the at least one refuse bin is within a proximity of the base station based at least in part on the determining.

In some embodiments, the user may be alerted that the refuse removal vehicle emptied the at least one refuse bin when the at least one refuse bin is not within a predetermined proximity of the base station. In further embodiments, a movement of the at least one refuse bine may be detected based at least in part on the one or more sensors and an administrator may be alerted of the detected movement.

In some embodiments, the one or more sensors may comprise one or more accelerometers and the movement may comprise at least a tilting motion. In further embodiments, the one or more sensors may comprise load sensors which may detect a change in the weight applied to the one or more sensors. In further embodiments, the one or more sensors may comprise at least one olfactory sensor. The olfactory sensors may detect a change in the smell of the at least one refuse bin.

According to another embodiment, an apparatus to communicate refuse reminders to a user of an automation system is also described. The apparatus may include a processor, a memory in electronic communication with the processor and instructions stored on the memory of the processor. The processor may execute the instructions to detect a proximity of at least one refuse bin to a base station at a predetermined time period prior to the refuse removal day using or more sensors and to alert the user to move the at least one refuse bin to a removal location based at least in part on the detecting.

According to another embodiment, a non-transitory computer-readable medium that may store instructions executable by a processor is also described. The instructions may detect a proximity of at least one refuse bin to a base station at a predetermined time period prior to the refuse removal day using or more sensors and alert the user to move the at least one refuse bin to a removal location based at least in part on the detecting.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the embodiments may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

Figure 1:
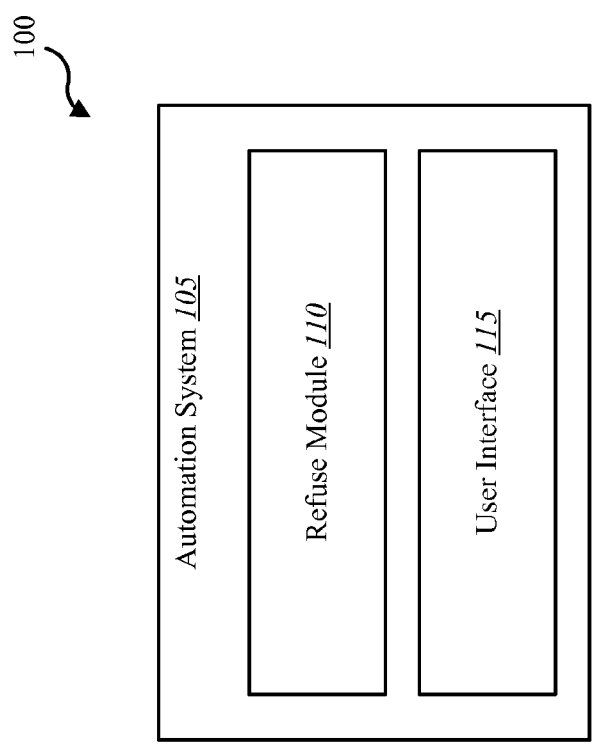
FIG. 1 is a block diagram of an environment in which the present systems and methods may be implemented.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION

The systems and methods described herein relate to home automation and home security, and related security systems and automation for use in commercial and business settings. More specifically, the systems and methods described herein relate to a system for reminding a user about refuse management. The reminders may comprise reminding a user that refuse management duties need to occur. The refuse management duties may comprise moving at least one refuse bin from one location to a removal location.

Refuse may comprise any discarded, unwanted or unnecessary material. For example, refuse may comprise garbage, recycling, yard waste, wet refuse, dry waste, bulky waste, non-compactible waste, and the like. In some embodiments, refuse may comprise a combination of different types of refuse or may comprise a single category of refuse. In some embodiments, refuse may be held in bins or containers. The refuse may be separated into different refuse bins. For example, a recycling bin may contain recycled items, and the like. The refuse bins may comprise trash cans, dustbin, litter bin, garbage can, waste basket, waste receptacle, dumpsters, or the like.

FIG. 1 is a block diagram illustrating one embodiment of an environment 100 in which the present systems and methods may be implemented. In some embodiments, the systems and methods described herein may be performed at least in part on or using an automation system 105. The environment 100 may include the automation system 105, a refuse module 110 and a user interface 115.

The refuse module 110 may manage refuse duties. For example, a user may be required to move their refuse bins in order for refuse to be removed from their home and/or commercial location. The user may require reminders as to where the bins are located, when the bins need to be moved, when the bins need to be returned to a base location, and the like. In some embodiments, a refuse removal schedule may be linked to the refuse module 110. The refuse removal schedule may comprise one or more schedules for one or more types of refuse. For example, the refuse removal schedule may comprise a first schedule for a first type of waste, a second schedule for removing a second type of waste, a third schedule for a third type of waste, and the like. The schedule may be an electronic schedule and may incorporate schedule changes due to holidays. In some embodiments, the refuse module 110 may receive alerts from a refuse removal organization. The alerts may convey changes to the refuse removal schedule and the like.

The user interface 115 may allow a user and/or administrator to interact with the automation system 105. A user may comprise any person with access to the automation and security system. A user may comprise an administrator, a family member, an employee and the like. The user may have varying levels of access and control over the automation and security system. The user interface 115 may facilitate communication between the user and the automation system 105. For example, in some embodiments, the automation system 105 may include a security system.

Figure 2:
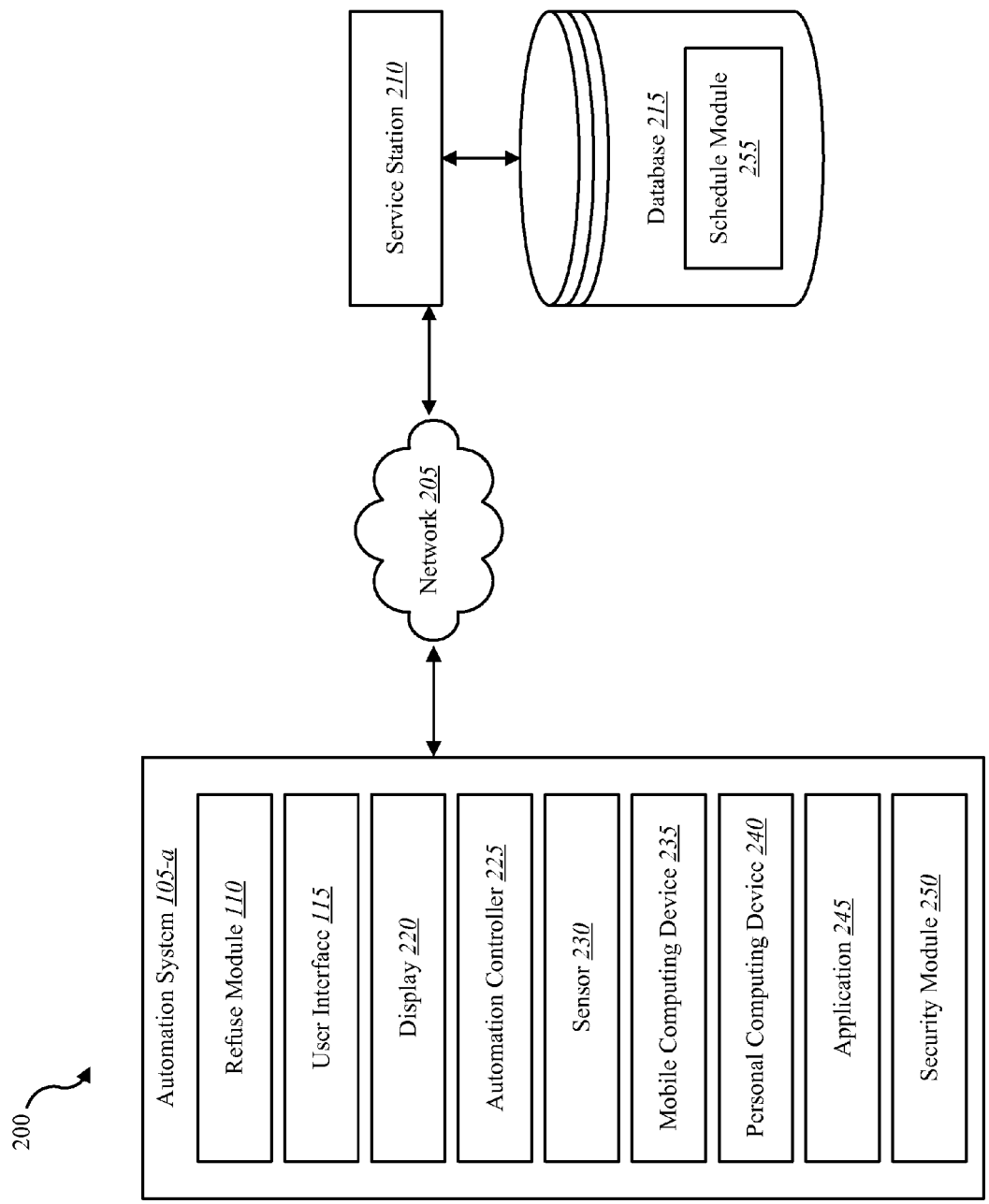
FIG. 2 is a block diagram of another environment in which the present systems and methods may be implemented.

Referring now to FIG. 2, in some embodiments, an environment 200 may include the components of the environment 100 described above, and may further include a network 205, a service station 210, and a database 215. Additionally, the environment 200 may include an automation system 105-a, which may be one example of the automation system 105 described above with reference to FIG. 1. The automation system 105-a may additionally include a display 220, an automation controller 225, a sensor 230, a mobile computing device 235, a personal computing device 240, an application 245, and a security module 250. The automation system 105-a may include various components and functionality that work cooperatively with the refuse module 110 and the user interface 115, and/or may operate independently of the refuse module 110 and the user interface 115.

The sensor 230 shown in FIG. 2 may represent one or more separate sensors or a combination of two or more sensors in a single sensor device. For example, the sensor 230 may represent one or more camera sensors and one or more motion sensors connected to the environment 200. Additionally, or alternatively, the sensor 230 may represent a combination sensor such as both a camera sensor and a motion sensor integrated in the same sensor device. Although the sensor 230 is depicted as connecting directly to the automation system 105-a, in some embodiments, the sensor 230 may connect to the automation system 105-a over network 205. Additionally, or alternatively, the sensor 230 may be integrated with a home appliance or fixture such as a light bulb fixture. The sensor 230 may include an accelerometer to enable the sensor 230 to detect a movement. The sensor 230 may include a wireless communication device enabling the sensor 230 to send and receive data and/or information to and from one or more devices in the environment 200. Additionally, or alternatively, the sensor 230 may include a GPS sensor to enable tracking a location of the sensor 230. The sensor 230 may include a proximity sensor to enable the sensor 230 to detect a proximity of a person relative to a predetermined distance from a dwelling (e.g., geo-fencing). The sensor 230 may include one or more security detection sensors such as, for example, a glass break sensor, a motion detection sensor, or both. Additionally, or alternatively, the sensor 230 may include a smoke detection sensor, a carbon monoxide sensor, or both. The sensor 230 may include one or more olfactory sensors. In some instances, the sensor 230 may include one or more load sensors which may detect a load or weight applied to the sensor.

In some embodiments, the mobile computing device 235 may include one or more processors, one or more memory devices, and/or a storage device. Examples of the mobile computing device 235 may include mobile phones, smart phones, tablets, personal digital assistants (PDAs), wearable computers, ultra-mobile PCs, etc. Although the mobile computing device 235 is depicted as connecting directly to the automation system 105-a, in some embodiments, the mobile computing device 235 may connect to the automation system 105-*a* over the network 205. Additionally, the mobile computing device 235 may represent a single mobile computing device or multiple mobile computing devices that may access the automation system 105-*a*.

In some embodiments, the personal computing device 240 may include one or more processors, one or more memory devices, and/or a storage device. Examples of the personal computing device 240 may include a viewing device associated with a media content set top box, satellite set top box, cable set top box, DVRs, personal video recorders (PVRs), mobile computing devices, computers, servers, etc. Although the personal computing device 240 is depicted as connecting directly to the automation system 105-*a*, in some embodiments, the personal computing device 240 may connect to the automation system 105-*a* over the network 205. Additionally, the personal computing device 240 may represent a single mobile computing device or multiple mobile computing devices that may access the automation system 105-*a*.

In some embodiments, a user may access the functions of automation system 105-*a* from either the mobile computing device 235 or the personal computing device 240. For example, in some embodiments, the user may have a user profile associated with the automation system 105-*a* and may access the system via the mobile computing device 235 or the personal computing device 240. In further embodiments, the user may have been granted limited accessibility to the automation system 105-*a* without generating a user profile. The user may access the automation system 105-*a* using their personal computing device 240 and/or mobile computing device 235 without a user profile associated with the automation system 105-*a*. In some embodiments, the mobile computing device 235 and/or the personal computing device 240 may include a mobile application interfacing with one or more functions of the automation system 105-*a*, and the service station 210.

Examples of the automation controller 225 may include a dedicated automation computing device. Examples of a dedicated computing device may include a wall-mounted controller, a remote control, a voice activated controller, and the like. In some embodiments, the automation controller 225 may control aspects of a property as well as receive and display notifications regarding monitored activity of a property.

In some embodiments, the application 245 may allow a user to control (either directly or via automation controller 225) an aspect of the monitored property based on the user accessibility permissions, including security, energy management, locking or unlocking a door, checking the status of a door, locating a person or item, controlling lighting, thermostat, cameras, receiving notification regarding a current status or anomaly associated with a home, office, place of business, and the like. In some configurations, the application 245 may enable the automation system 105-*a* to interface with the automation controller 225 and enable the user interface 115 to display automation, security, and/or user management content on the display 220, the mobile computing device 235 and/or the personal computing device 240. Further, the application 245 may be installed on the mobile computing device 235 and/or on the personal computing device 240 to allow a user to interface with the automation system 105-*a* and the service station 210.

In some embodiments, the automation system 105-*a* may communicate with the service station 210 via the network 205. Examples of the network 205 include cloud networks, local area networks (LAN), wide area networks (WAN), virtual private networks (VPN), wireless networks (using 802.11, for example), and/or cellular networks (using 3G and/or LTE, for example), etc. The network 205 may be a single network, or may include multiple interconnected, overlapping, or coincidental networks. For example, in some embodiments, the network 205 may include multiple networks interconnected to facilitate communication or may include redundant networks. For example, the network 205 may represent a first network (e.g., the Internet) and a second network (e.g., cellular networks).

The service station 210 shown in FIG. 2 may represent one or more separate service stations or a combination service stations. The service station 210 may be a network operations center, a monitoring center, a service station or any similar station in association with the automation system service provider. In some embodiments, the service station 210 may perform various and/or all aspects of the refuse module 110.

In some embodiments, the service station 210 may be coupled to the database 215. The database 215 may include, for example, schedules associated with varying types of refuse and neighborhoods for each automation system 105-*a* monitored by the service station 210. For example, the database 215 may include a schedule module 255 which may store and periodically update a schedule relating to refuse management. The schedule module 255 may comprise historical information and may communicate directly with a refuse removal company. The database 215 may include other information including, for example, historical information about the automation system 105-*a* and other aspects of environment 200, and the like.

Figure 3:
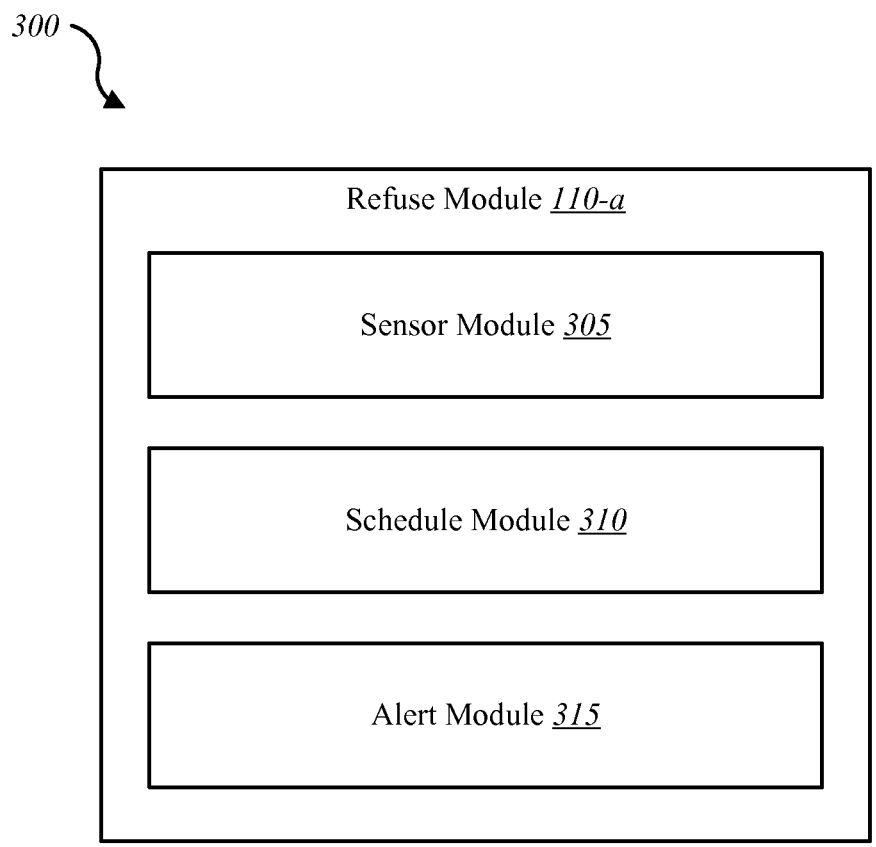
FIG. 3 is a block diagram of an example refuse module of the environments shown in FIGS. 1 and 2.

FIG. 3 is a block diagram 300 illustrating one example of a refuse module 110-*a*. The refuse module 110-*a* may be one example of the refuse module 110 depicted in FIGS. 1 and/or 2. As depicted, the refuse module 110-*a* may include a sensor module 305, a schedule module 310, and an alert module 315. The refuse module 110-*a* may include additional modules and capabilities in other embodiments. Similarly, the refuse module 110-*a* may include fewer number of modules and functionality than that which is described with reference to FIG. 3. The refuse module 110-*a* may remind a user of the automation system when particular refuse needs to be relocated to a refuse removal location.

In some embodiments, the sensor module 305 may track one or more sensors associated with one or more refuse bins. For example, the refuse bins may have a base station. The base station may be the location where one or more refuses bins are stored. A removal location may be a location where the one or more refuse bins are placed for its contents to be removed. The removal location may be a curbside or similar location where refuse can be picked up. For example, a refuse removal company may empty the refuse contained within the refuse bins into one or more refuse removal vehicles.

In some embodiments, one or more sensors may help determine a location of the refuse bin. For example, the sensor module 305 may track one or more sensors to determine if a refuse bin is located at its base station or at a removal location. For example, in some embodiments, a refuse container may comprise a first sensor and a refuse home location may comprise a second sensor. The first sensor and second sensor may communicate with each other. For example, the first sensor and second sensor may determine a proximity between the two. The proximity may be a predetermined distance between the first and second sensor. The first and second sensor may only have detection capabilities when the two sensors are within the predetermined distance. For example, the first sensor may detect the presence of the second sensor for a distance of two feet. If the first and second sensor are further than two feet apart, the sensors cannot detect the other's presence.

The sensor module 305 may monitor the proximity of the sensors to determine a location of the refuse bin. For example, the sensor module 305 may continuously monitor when the sensors are within the predetermined distance of each other. In other instances, the sensor module 305 may monitor the proximity of the sensors during predetermined times. For example, sensor module 305 may monitor the proximity of the sensors according to the schedule module 310.

Other sensors may also be used to track a location of one or more refuse bins. For example, a GPS sensor may be attached to each refuse bin. An accelerometer may also be attached to the refuse bin to detect movement of the refuse bin. In some embodiments, a motion detector may be positioned at the home location which may detect movement of the refuse bin. An optical sensor may also detect when the refuse bin is at the home location or when it has been moved to the removal location.

In some embodiments, the sensor module 305 may detect when refuse has been picked up. For example, the at least one refuse bin may include one or more accelerometers. The one or more accelerometers may detect movement of the refuse bin. Movement may include the physical moving of the refuse bin from a first location to a second location. The movement may also include a tipping or dumping motion. The tipping or dumping motion may occur when refuse contained within the refuse bin is being emptied into a refuse removal vehicle.

The schedule module 310 may track one or more schedules associated with refuse removal. For example, the schedule module 310 may receive one or more refuse removal schedules. The schedule module 310 may coordinate the refuse removal schedule with one or more calendars associated with an automation system. The one or more schedules may comprise different schedules for different types of refuse. For example, typical garbage may be picked up weekly, whereas recycling may be on a bi-weekly schedule. Yard waste and other refuse may also have different removal schedules. The schedule module 310 may observe the schedules for each type of refuse and associate the accurate schedule with the appropriate refuse bin. For example, the schedule module 310 may uniquely assign a sensor to a particular removal schedule.

The alert module 315 may generate and send alerts based at least in part on data from the sensor module 305 and the schedule module 310. For example, the alert module 315 may send alerts notifying a user to move at least one refuse bin from a base station to a removal location and vice versa. In some embodiments, the alert module 315 may generate and send an alert to the user as a reminder to move the refuse bin to the removal location. In some embodiments, the refuse removal vehicle may have a GPS tracker or other sensor on it. The alert module 315 may detect when the removal vehicle is within a predetermined proximity of the refuse removal location. The alert module 315 may generate and send an alert to a user of the automation system reminding them of the pending removal and the limited time frame with which to move the refuse bin to the removal location. In further embodiments, alerts may be generated specific to the refuse. For example, the alert module 315 may send a reminder to the user to relocate the garbage bin, the recycling bin, bulk items, yard waste, or some combination thereof based on different removal schedules for each type of refuse.

In some embodiments, the alert module 315 may send a reminder regardless of the status of the refuse bin. For example, a predetermined time before a scheduled removal, the alert module 315 may remind a user of the upcoming removal and list the types of refuse scheduled to be removed. In other embodiments, an administrator or user may schedule reminders when the refuse bins have not been moved. For example, the alert module 315 may be programmed to send an alert at a predetermined time if the refuse bins have not been moved to a removal location. Prior to the scheduled alert time, the alert module 315 may determine, using the sensor module 305, if the appropriate refuse bins have been moved. Based upon the response from the sensor module 305, the alert module 315 may determine whether to send an alert. In some embodiments, the user may have forgotten to move one of the bins or moved an incorrect bin. For example, the user may have put out the garbage but forgot to put out the recycling bin. The alert module 315 may send a reminder that the recycling bin also needs to be moved to a removal location. In other embodiments, the user may have accidently put out the recycling on a non-scheduled day. The alert module 315 may send a reminder that the recycling is not scheduled to be picked up and that the user should return the bin to the home station.

Figure 4:
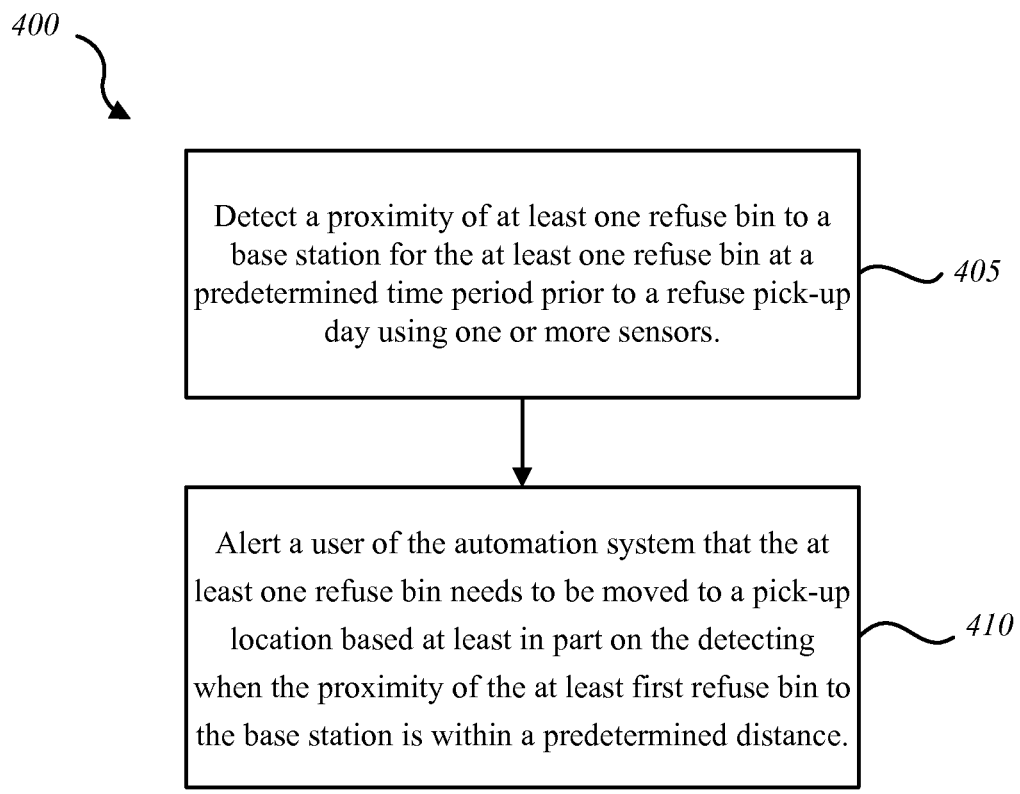
FIG. 4 is a flow diagram illustrating an exemplary method for refuse reminders.

FIG. 4 is a flow diagram illustrating one embodiment of a method 400 for adding a one-time access to an automation system. In some configurations, the method 400 may be implemented in whole or in part by the refuse module 110 of the automation system 105 shown in FIGS. 1 and/or 2. In further embodiments, the method 400 may be performed generally by the automation system 105 shown in FIGS. 1 and/or 2, or even more generally by the environments 100, 200 shown in FIGS. 1 and/or 2.

At block 405, a proximity of at least one refuse bin to a base station for the at least one refuse bin may be detected at a predetermined time period prior to a refuse removal day using one or more sensors. For example, one or more refuse bins may need to be moved from a home station to a removal location to have its contents emptied. A refuse removal company may have a refuse removal vehicle empty the refuse on a set schedule.

In some embodiments, the at least one refuse bin may be proximate one or more sensors. The sensors may be affixed to a base station associated with the refuse bin. The sensors may also be affixed or otherwise coupled to the refuse bin. In some embodiments, a single sensor may be used. The single sensor may be a GPS sensor which may detect a geographical location of the refuse bin. The automation system may create a geo-fence around the base station and may detect the presence of the refuse bin within the geo-fence location using the GPS sensor. In another embodiment, one or more load sensors may be located at the base station. The one or more load sensors may detect a presence of the refuse bin at the base location by detecting the weight presence of the refuse bin. In some embodiments, the one or more weight sensors may also calculate and track the weight of the accumulated refuse.

In some embodiments two sensors may be used to detect a presence of the refuse bin at the base station. For example, two proximity sensors may be used. One proximity sensor may be attached to the refuse bin and a second proximity sensor may be attached to the base station. The sensors may be aligned such that they detect a presence of the other sensor within a predetermined distance, which may be based in part on the capability of the sensors. For example, the proximity sensors may have a functional distance range.

At block 410, a user of the automation system may be alerted that the at least one refuse bin needs to be moved to a removal location based at least in part on the detecting when the proximity of the at least first refuse bin to the base station is within a predetermined distance. For example, the user of the automation system may receive an alert a predetermined time frame prior to a scheduled refuse removal time. The predetermined time frame may be a default time or may be set by the user. In some embodiments, the user may wish to receive multiple notifications. For example, the user may wish to receive a notification at 5:00 PM the day before a removal day. The user may additionally wish to receive further notifications either later on that day or the morning of the removal day or both. The user may also receive multiple reminders for each type of refuse scheduled to be picked up. For example, the user may receive a notification that the garbage has been moved to a removal location but that the recycling also needs to be moved to the removal location.

Figure 5:
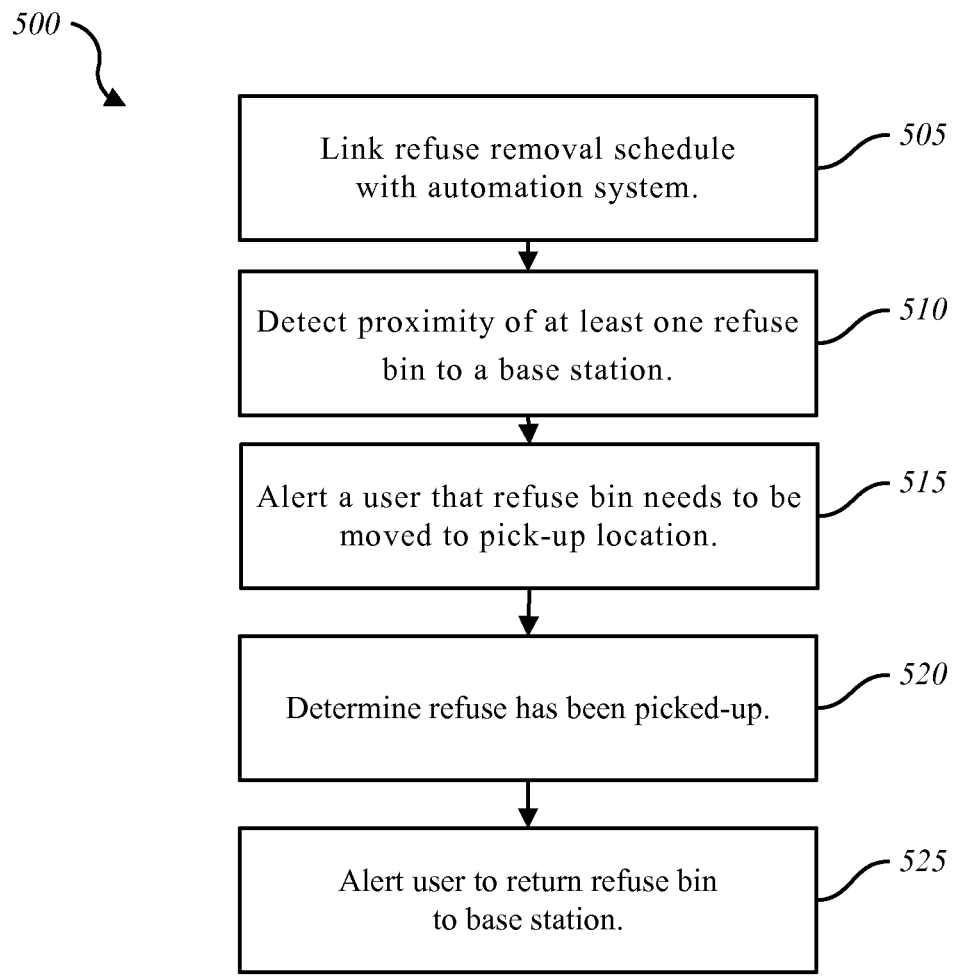
FIG. 5 is another flow diagram illustrating another exemplary method for refuse reminders.

FIG. 5 is a flow diagram illustrating one embodiment of a method 500 for permitting a user one time access to an automation system. In some configurations, the method 500 may be implemented in whole or in part by the refuse module 110 of the automation system 105 shown in FIGS. 1 and 2. In further configurations, the method 500 may be performed generally by the automation system 105 shown in FIGS. 1 and/or 2, or even more generally by the environments 100, 200 shown in FIGS. 1 and/or 2.

At block 505, a refuse removal scheduled may be linked to an automation system. For example, an administrator of the automation system may manually input the refuse removal schedule into a calendar associated with an automation system. In other embodiments, a user may upload a schedule which the automation system may enter into its calendar. In further embodiments, the automation system may receive the refuse removal schedule directly from a refuse removal company. For example, the refuse removal schedule may be emailed or otherwise directly sent to the automation system. The automation system may receive the schedule and update the calendar. In some embodiments, the automation system may adjust the refuse removal schedule based on inputs. For example, the refuse removal schedule may change based on weather, holidays, changes in schedule and the like. The automation system may receive notifications of a schedule change and alter the automation system schedule accordingly.

At block 510, a proximity of at least one refuse bin to a base station may be detected. The at least refuse bin may comprise a first type of refuse. The first type of refuse may be garbage. Additional refuse bins may be present. For example, a second refuse bin may comprise recycling and a third refuse bin may comprise yard waste. In some embodiments, multiple recycling bins may be present. Additionally, multiple garbage bins, and the like may be present. There also may be additional types of refuse bins. For example, there may be wet refuse such as food waste, product and meat waste. There may also be dry waste, bulky waste, non-compactible waste, and the like. Dry waste may comprise paper, corrugated boxes, and the like. Bulky waste may comprise wooden crates, pallets, drums, appliances, metal cabinets, furniture, and the like. Non-compactible waste may comprise stacked newspapers, bundled computer paper, phone books, and the like.

The proximity of the at least one refuse bin to a base station may be detected using one or more sensors. For example, one or more sensors may detect a proximity of the refuse bin to a base station. In further embodiments, the sensors may comprise GPS sensors, proximity sensors, load sensors, olfactory sensors, accelerometers, optical sensors, and the like. The number of sensors may depend upon the number of refuse bins and the type of sensor. For example, if a GPS sensor is used, one GPS sensor may be attached to each refuse bin to track the location of the refuse bin. In further embodiments, two or more sensors may be used to determine the proximity of a refuse bin to a base location. For example, proximity sensors may detect a distance between the two sensors. If proximity sensors are used, a proximity sensor may be coupled to the refuse bin and to the base station. The proximity sensors may then determine a distance between the sensors to determine if the refuse bin is within an acceptable proximity of the base station.

At block 515, the user may be alerted that the refuse bin needs to be moved to a removal location. For example, if the at least one refuse bin is still at a base location, the user may be reminded to move the at least one refuse bin to the removal location. The sensors may detect the location of the refuse bin and determine if the refuse bin is located at the base station. If the refuse bin is located at the base station a predetermined time period before a scheduled removal, the user may receive an alert to move the refuse bin. In some embodiments, the user may also receive a reminder of a pending refuse removal regardless of the location of the refuse bin. Additionally, the user may receive multiple alerts if more than one refuse bin is present.

In some embodiments, the user may be a delegate assigned the task of refuse management. For example, an administrator of the automation system may assign a delegate to handle the refuse bins. The administrator may be a parent, an employer, or the like and the delegate may be a child, an employee, or the like. In some embodiments, the administrator may receive a message and/or alert if the at least one refuse bin has not been relocated to a removal location. For example, the administrator may receive a notice at a predetermined time period prior to a scheduled removal that the refuse bin is still located at the base station. The administrator may move the refuse bins or may directly contact the delegate to have them move the refuse bins.

At block 520, it may be determined whether the refuse has been removed. For example, it may be a time after the scheduled refuse removal. In some embodiments, an accelerometer on the refuse bin may detect when the refuse bin is tilted, thus the refuse is emptied into a refuse removal vehicle. The removal location may also be equipped with a load sensor, which may detect a change in the weight of the refuse bin thus signaling when the bin has been emptied. The refuse removal vehicle may also be equipped with a GPS or other tracking mechanism. The automation system may detect when the refuse removal vehicle has passed the removal location, thus signaling the refuse has been removed. The automation system may also have optical sensors which may detect when a refuse removal vehicle has removed the refuse. An olfactory sensor located within a receptacle of the refuse bin may also detect a reduction in smell thus signaling the refuse has been removed.

At block 525, the user may be alerted to return the at least one refuse bin to the base station. For example, if the refuse bin has not been returned to the base station within a predetermined time period, the user may receive an alert to do so. For example, the user may receive an alert notifying the user that the refuse has been removed and that the refuse bins are ready to be moved back to a base station. If the user has not moved the bins within a predetermined time period, the user may continue to receive reminders until the refuse bins are returned. In other embodiments, the user may start receiving alerts if the refuse bins have not been returned by a predetermined time. The time may be a default time set by the automation system or may be set by an administrator or user. Additionally, an administrator may be alerted if a delegate has not performed their refuse management duties. For example, the administrator may receive an alert if the one or more refuse bins were not returned to the base station by a predetermined time.

Figure 6:
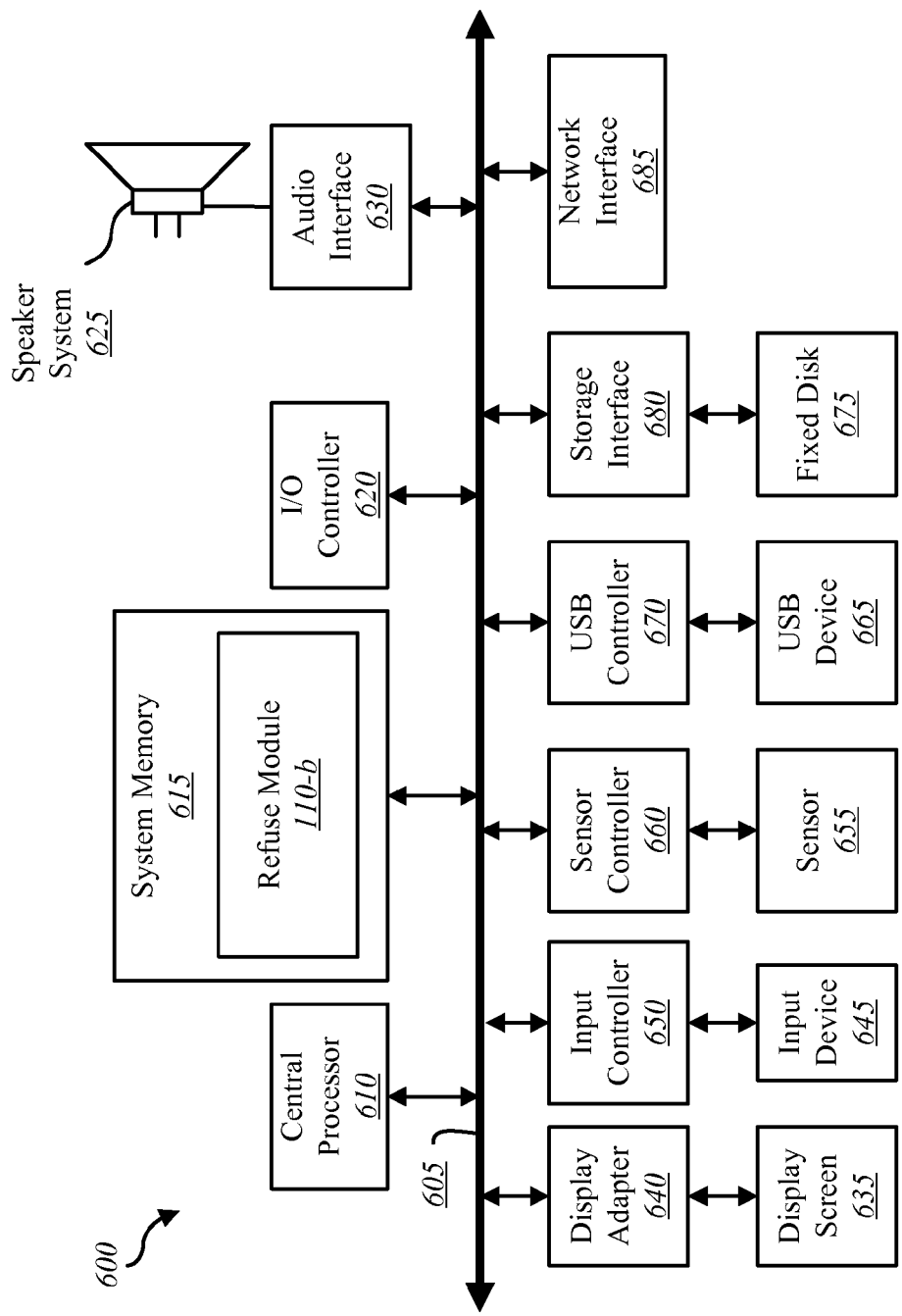
FIG. 6 is a block diagram of a computer system suitable for implementing the present systems and methods of FIGS. 1-5.

FIG. 6 depicts a block diagram of a controller 600 suitable for implementing the present systems and methods. The controller 600 may be an example of the automation controller 225, the personal computing device 240, and/or the mobile computing device 235 illustrated in FIG. 2. In one configuration, the controller 600 may include a bus 605 which interconnects major subsystems of controller 600, such as a central processor 610, a system memory 615 (typically RAM, but which may also include ROM, flash RAM, or the like), an input/output controller 620, an external audio device, such as a speaker system 625 via an audio output interface 630, an external device, such as a display screen 635 via display adapter 640, an input device 645 (e.g., remote control device interfaced with an input controller 650), multiple USB devices 665 (interfaced with a USB controller 670), and a storage interface 680. Also included are at least one sensor 655 connected to bus 605 through a sensor controller 660 and a network interface 685 (coupled directly to bus 605).

Bus 605 allows data communication between central processor 610 and system memory 615, which may include read-only memory (ROM) or flash memory (neither shown), and random access memory (RAM) (not shown), as previously noted. The RAM is generally the main memory into which the operating system and application programs are loaded. The ROM or flash memory can include, among other code, the Basic Input-Output system (BIOS) which controls basic hardware operation such as the interaction with peripheral components or devices. For example, a refuse module 110-b to implement the present systems and methods may be stored within the system memory 615. The refuse module 110-b may be an example of the refuse module 110 illustrated in FIGS. 1, 2, and/or 3. Applications (e.g., application 245) resident with controller 600 are generally stored on and accessed via a non-transitory computer readable medium, such as a hard disk drive (e.g., fixed disk drive 675) or other storage medium. Additionally, applications can be in the form of electronic signals modulated in accordance with the application and data communication technology when accessed via the network interface 685.

Storage interface 680, as with the other storage interfaces of controller 600, can connect to a standard computer readable medium for storage and/or retrieval of information, such as a fixed disk drive 675. The fixed disk drive 675 may be a part of controller 600 or may be separate and accessed through other interface systems. Network interface 685 may provide a direct connection to a remote server via a direct network link to the Internet via a POP (point of presence). Network interface 685 may provide such connection using wireless techniques, including digital cellular telephone connection, Cellular Digital Packet Data (CDPD) connection, digital satellite data connection, or the like. In some embodiments, one or more sensors (e.g., motion sensor, smoke sensor, glass break sensor, door sensor, window sensor, carbon monoxide sensor, and the like) connect to controller 600 wirelessly via network interface 685.

Many other devices or subsystems (not shown) may be connected in a similar manner (e.g., entertainment system, computing device, remote cameras, wireless key fob, wall mounted user interface device, cell radio module, battery, alarm siren, door lock, lighting system, thermostat, home appliance monitor, utility equipment monitor, and so on). Conversely, all of the devices shown in FIG. 6 need not be present to practice the present systems and methods. The devices and subsystems can be interconnected in different ways from that shown in FIG. 6. The aspect of some operations of a system such as that shown in FIG. 6 are readily known in the art and are not discussed in detail in this application. Code to implement the present disclosure can be stored in a non-transitory computer-readable medium such as one or more of system memory 615 or fixed disk 675. The operating system provided on controller 600 may be iOS® ANDROID®, MS-DOS®, MS-WINDOWS®, OS/2® UNIX®, LINUX® or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." In addition, the term "based on" as used in the specification and the claims is to be construed as meaning "based at least upon."

What is claimed is:

1. A computer-implemented method to communicate refuse reminders, comprising:
    detecting, via one or more sensors, a proximity of at least one refuse bin to a base station for the at least one refuse bin at a predetermined time period prior to a refuse removal period;
    producing an alert to move the at least one refuse bin to a removal location based at least in part on the detecting; and
    alerting an administrator of an automation system when the refuse bin is within a predetermined proximity of the base station a predetermined time period before a scheduled refuse removal.

2. The computer-implemented method of claim 1, further comprising
    linking a refuse removal schedule with an automation system, wherein the refuse removal schedule comprises a schedule of refuse removal days for a first category of refuse.

3. The computer-implemented method of claim 1, further comprising:
    detecting the proximity of the at least one refuse bin to the base station a predetermined time period after a scheduled refuse removal; and
    alerting a user to return the at least one refuse bin to the base station when the proximity of the at least on refuse bin to the base station is not within a predetermined distance based at least in part on the detecting.

4. The computer-implemented method of claim 1, further comprising:
    detecting a proximity of a first refuse bin to a first base station on a first schedule; and
    detecting a proximity of a second refuse bin to a second base station on a second schedule.

5. The computer-implemented method of claim 1, further comprising:
    detecting a location of a refuse removal vehicle;
    comparing the location of the refuse removal vehicle to a refuse removal route;
    determining the refuse removal vehicle has passed the location of the automation system on the refuse removal route;
    alerting a user of a missed opportunity to have refuse removed when the at least one refuse bin is within a predetermined proximity of the base station based at least in part on the determining.

6. The computer-implemented method of claim 5, further comprising:
    alerting a user that the refuse removal vehicle emptied the at least one refuse bin when the at least one refuse bin is not within the predetermined proximity of the base station.

7. The computer-implemented method of claim 1, further comprising:
    detecting a movement of the at least one refuse bin based at least in part on one or more sensors; and
    alerting an administrator of the detected movement.

8. The computer-implemented method of claim 7, wherein the one or more sensors comprises one or more accelerometers and the movement comprises at least a tilting motion.

9. The computer-implemented method of claim 1, wherein the one or more sensors are load based sensors and detect a change in the weight applied to the one or more sensors.

10. The computer-implemented method of claim 1, wherein the one or more sensors comprises an olfactory sensor and wherein the olfactory sensor detects a change in a smell of the at least one refuse bin.

11. An apparatus to communicate refuse reminders to a user of an automation system, comprising:
    a processor;
    a memory in electronic communication with the processor; and
    instructions stored in the memory, the instructions being executable by the processor to:
        detect a proximity of at least one refuse bin to a base station for the at least one refuse bin at a predetermined time period prior to a refuse removal day using one or more sensors;
        alert a user of the automation system to move the at least one refuse bin to a removal location based at least in part on the detecting; and
        detect the proximity of the at least one refuse bin to the base station a predetermined time period after a scheduled refuse removal; and
        alert the user to return the at least one refuse bin to the base station when the proximity of the at least on refuse bin to the base station is not within a predetermined distance based at least in part on the detecting.

12. The apparatus of claim 11, wherein the instructions are executable by the processor to:
    link a refuse removal schedule with the automation system, wherein the refuse removal schedule comprises a schedule of refuse removal days for a first category of refuse.

13. The apparatus of claim 11, wherein the instructions are executable by the processor to:
    alert an administrator of the automation system when the refuse bin is within a predetermined proximity of the base station a predetermined time period before a scheduled refuse removal.

14. The apparatus of claim 11, wherein the instructions are executable by the processor to:
    detect a proximity of a first refuse bin to a first base station on a first schedule; and
    detect a proximity of a second refuse bin to a second base station on a second schedule.

15. A non-transitory computer-readable medium storing instructions executable by a processor to:
- detect a proximity of at least one refuse bin to a base station for the at least one refuse bin at a predetermined time period prior to a refuse removal day using one or more sensors;
- alert a user of the automation system to move the at least one refuse bin to a removal location based at least in part on the detecting; and
- alert an administrator of an automation system when the refuse bin is within a predetermined proximity of the base station a predetermined time period before a scheduled refuse removal.

16. The computer-readable medium of claim 15, wherein the instructions are executable by the processor to:
- link a refuse removal schedule with the automation system, wherein the refuse removal schedule comprises a schedule of refuse removal days for a first category of refuse.

17. The computer-readable medium of claim 15, wherein the instructions are executable by the processor to:
- detect the proximity of the at least one refuse bin to the base station a predetermined time period after a scheduled refuse removal; and
- alert the user to return the at least one refuse bin to the base station when the proximity of the at least on refuse bin to the base station is not within a predetermined distance based at least in part on the detecting.

18. The computer-readable medium of claim 15, wherein the instructions are executable by the processor to:
- detect a proximity of a first refuse bin to a first base station on a first schedule; and
- detect a proximity of a second refuse bin to a second base station on a second schedule.

* * * * *